United States Patent
Schwartz

(10) Patent No.: US 9,496,724 B2
(45) Date of Patent: Nov. 15, 2016

(54) ACTIVE BATTERY BALANCING CIRCUIT AND METHOD OF BALANCING AN ELECTRIC CHARGE IN A PLURALITY OF CELLS OF A BATTERY

(71) Applicant: STMicroelectronics Application GmbH, Grassbrunn (DE)

(72) Inventor: Reiner Schwartz, Forstinning (DE)

(73) Assignee: STMICROELECTRONICS APPLICATION GMBH, Grasbrunn (DE)

( * ) Notice: Subject to any disclaimer, the term of this patent is extended or adjusted under 35 U.S.C. 154(b) by 549 days.

(21) Appl. No.: 13/849,374

(22) Filed: Mar. 22, 2013

(65) Prior Publication Data

US 2013/0214724 A1    Aug. 22, 2013

Related U.S. Application Data

(63) Continuation of application No. PCT/US2011/052812, filed on Sep. 22, 2011.

(30) Foreign Application Priority Data

Sep. 23, 2010 (IT) .............. VI2010A0257

(51) Int. Cl.
*H02J 7/00* (2006.01)
*B60L 11/18* (2006.01)

(52) U.S. Cl.
CPC .......... *H02J 7/0019* (2013.01); *B60L 11/1866* (2013.01); *H02J 7/0016* (2013.01); *B60L 2240/547* (2013.01); *B60L 2240/549* (2013.01); *Y02T 10/7005* (2013.01); *Y02T 10/7061* (2013.01)

(58) Field of Classification Search
CPC ..................................................... H02J 7/0019
USPC ......................................................... 320/103
See application file for complete search history.

(56) References Cited

U.S. PATENT DOCUMENTS

| | | | | |
|---|---|---|---|---|
| 5,479,083 A * | 12/1995 | Brainard | ...... | 320/121 |
| 5,631,534 A * | 5/1997 | Lewis | ...... | H01M 10/441 320/103 |
| 5,710,504 A | 1/1998 | Pascual et al. | | |
| 6,624,612 B1 * | 9/2003 | Lundquist | ...... | 320/118 |
| 7,612,530 B2 * | 11/2009 | Konishi | ...... | H02J 7/0016 320/118 |
| 8,493,028 B2 * | 7/2013 | Sutardja | ...... | H02J 7/0014 320/116 |
| 2008/0211459 A1* | 9/2008 | Choi | ...... | 320/134 |

(Continued)

FOREIGN PATENT DOCUMENTS

WO    2010/079061 A1    7/2010

*Primary Examiner* — Samuel Berhanu
*Assistant Examiner* — Tessema Kebede
(74) *Attorney, Agent, or Firm* — Seed IP Law Group LLP

(57) ABSTRACT

A method and an active battery balancing circuit for balancing an electric charge in a plurality of cells of a battery that are electrically connected in series is disclosed. A first subset of the cells of the battery is electrically connected to an inductance for providing a current flow from the first subset through the inductance. The first subset of the cells is disconnected from the inductance, and a current is allowed to flow from the inductance into a second subset of the cells of the battery. At least one of the first and the second subset of the cells of the battery comprises two or more cells.

19 Claims, 5 Drawing Sheets

(56) References Cited

U.S. PATENT DOCUMENTS

| | | |
|---|---|---|
| 2009/0102422 A1 | 4/2009 | Naganuma et al. |
| 2009/0140694 A1 | 6/2009 | Zeng |
| 2010/0109608 A1* | 5/2010 | Buono et al. ............... 320/121 |
| 2010/0164430 A1 | 7/2010 | Lu et al. |
| 2011/0204722 A1 | 8/2011 | Kim |

* cited by examiner

ACTIVE BATTERY BALANCING CIRCUIT AND METHOD OF BALANCING AN ELECTRIC CHARGE IN A PLURALITY OF CELLS OF A BATTERY

BACKGROUND

1. Technical Field

The present disclosure generally relates to battery power sources, in particular to an active battery balancing circuit, to a method of balancing an electric charge in a plurality of cells of a battery, and to a power source wherein an active battery balancing circuit is employed.

2. Description of the Related Art

Rechargeable batteries are used as a power source for various devices, from small devices having a relatively low power consumption such as mobile phones, digital cameras and media players to devices that have a high power consumption and/or require a voltage of up to several hundred Volt such as electric vehicles and hybrid vehicles, in particular electric and hybrid cars. Besides lead acid batteries, nickel cadmium batteries, and nickel metal hydride batteries, lithium ion batteries have recently gained popularity, due to their high energy-to-weight ratio, absence of memory effect and slow loss of charge when not in use.

In applications wherein a voltage that is greater than the voltage of a single cell (approximately 2 Volt for a lead acid cell, 1.2 Volt for nickel cadmium and nickel metal hydride cells, and approximately 3.6 Volt for lithium ion cells), a plurality of cells are electrically connected in series. For achieving higher operating voltages of about 200 to about 300 or more Volts, as may be used in electric or hybrid car applications, stacks comprising many cells which are electrically connected in series are used.

Battery cells can be damaged when they are used outside an allowable voltage range, both when they are charged to a voltage that is greater than a maximum allowed voltage (overcharge), and when they are deeply discharged such that the voltage between the poles of the cell is smaller than a particular minimum voltage that depends on the type of the cell. Lithium ion cells can be particularly susceptible to damage outside of an allowable voltage range.

In a battery comprising a plurality of cells, the individual cells can have a different capacity, for example due to production tolerances, uneven temperature distribution in the battery, and differences in the aging characteristics of the cells. Moreover, the individual cells in a battery can have a different state of charge, due to fluctuations that may occur in the charge or discharge process of the battery.

If there is a degraded cell having a diminished capacity in the battery, or a cell having a higher charge than the other cells, there is a danger that once such a cell has reached its full charge, it will be subject to overcharging until the other cells of the battery reach their full charge. The result can be temperature and pressure build up and possible damage to the cell. During discharge, a cell having a smaller capacity than the other cells, or a lower charge, will have the greatest depth of discharge and will tend to fail before the other cells. It is even possible for the voltage on the cell(s) having the lowest state of charge and/or the smallest capacity to be reversed as the cell(s) become fully discharged before the rest of the cells, which may lead to a premature failure of the cell.

For overcoming these problems, it has been proposed to balance the charge of the individual cells, using specific charge balancing circuits connected to the cells of a battery and/or incorporated into the battery. Such charge balancing circuits can be classified as passive and active balancing circuits.

A passive battery balancing circuit according to the state of the art will be described with reference to FIG. 1.

In FIG. 1, reference numeral 111 denotes a battery comprising a plurality of cells 101, 102 that are electrically connected in series between a positive pole 112 and a negative pole 113 of the battery 111. In addition to cells 101, 102, further cells can be present in the battery 111, as schematically indicated by three dots between cell 101 and the positive pole 112.

Each of the cells 101, 102 has a positive pole and a negative pole. In accordance with conventional circuit symbols, cells 101, 102 are shown as a pair of parallel lines, wherein the longer line denotes the positive pole, and the shorter line denotes the negative pole.

A passive balancing circuit 100 is connected to the battery 111. The balancing circuit 100 comprises a plurality of bypass resistors 103, 104 and switches 105, 106. The switches 105, 106 can be solid state switches, each comprising one or more transistors, and can be operated by a control circuit (not shown) of the balancing circuit 100.

By closing a respective one of the switches 105, 106, each of the bypass resistors 103, 104 can be connected between the poles of one of the cells 101, 102. For example, by closing the switch 105, the bypass resistor 103 can be connected between the poles of the cell 101. If this is done while the battery 111 is charged, a part of the current applied to the battery 111 flows through the bypass resistor 103 instead of flowing into the cell 101, such that the cell 101 is charged to a smaller extent than it would be if the switch 105 were open. If the switch 105 is closed while the battery 111 is discharged, or while the battery 111 is idle, a current can flow between the positive and the negative pole of the cell 101 through the bypass resistor 103, such that the cell 101 is discharged. In either case, by closing the switch 105, the amount of charge in cell 101 is reduced compared to a case wherein the switch 105 is open. Thus, the charge of the cells 101, 102 can be balanced by closing switches associated with cells having a particularly high state of charge, for selectively reducing the amount of charge stored in these cells relative to the charge of other cells of the battery 111.

A disadvantage of this approach is that passive charge balancing leads to a loss of energy in the battery 111, since energy is converted to heat in the bypass resistors 103, 104.

For avoiding such a loss of energy, active balancing has been proposed, wherein charge and energy are transferred between the cells 101, 102 of a battery 111.

An active battery balancing circuit 200 according to the state of the art will be described with reference to FIG. 2. The balancing circuit 200 comprises a capacitor 201 and switches 202, 203. Similar to the switches 105, 106 described above with reference to FIG. 1, the switches 202 can be solid state switches, and can be operated by a control unit (not shown).

One of the terminals of the capacitor 201 can alternatively be connected to the positive pole and the negative pole of the cell 101 by operation of the switch 202, and the other terminal of the capacitor 201 can alternatively be connected to the positive and negative pole of the cell 102 by operating the switch 203. Similar arrangements of capacitors and switches can be provided between other pairs of cells in the battery 111. In the balancing circuit 200, energy and charge can be transferred from a cell of the battery 111 to capacitor 201 and from capacitor 2001 to another cell having a lower voltage.

As an example, a case will be described wherein the cell 101 has a higher voltage than the cell 102. First, the switches 202, 203 are operated such that the capacitor 201 is connected between the positive and the negative pole of the cell 101. In doing so, the capacitor 201 is charged to approximately the voltage between the poles of the cell 101. Thereafter, the switches 202, 203 are operated such that the capacitor 201 is connected between the poles of the cell 102. Since the voltage of the cell 102 is smaller than the voltage of the cell 101, and the capacitor 201 has been charged to the voltage of the cell 101, the capacitor 201 now has a higher voltage than the cell 102, such that charge from the capacitor 201 is flowing into the cell 102 until the voltage of the capacitor 201 equals the voltage of the cell 102. Thereby, the cell 101 is partially discharged, and cell 102 is charged. Subsequently, the process can be repeated.

A disadvantage of the battery balancing circuit 200 is that the operation of the balancing circuit 200 can be relatively inefficient, such that a relatively large fraction of the energy transferred from cells 101, 102 to capacitor 201 is lost.

FIG. 3 shows another active battery balancing circuit 300 according to the state of the art. The balancing circuit 300 comprises an inductance 301, for example a coil, and a switch 302 that can, for example, be a solid state switch operated by a control unit (not shown). By operating the switch 302, the inductance 301 can alternatively be connected between the poles of the cell 101 and the poles of the cell 102. Similar circuitry comprising an inductance and a switch can be provided between other pairs of cells in the battery 111.

For transferring energy and charge from one of the cells 101, 102 of the battery 111, for example cell 101, to another one of the cells of the battery 111, for example cell 102, the switch 302 can be operated for connecting the coil 301 between the poles of the cell 101. Thus, an electric current through the inductance 301 begins to flow between the poles of the cell 101. The current increases with time, and an increasing magnetic field is built up in the inductance 301. Thereafter, the switch 302 is operated for connecting the inductance 301 between the poles of the cell 102. Since energy is stored in the magnetic field in the inductance 301, an electric current continues to flow through the inductance 301. Since the inductance 301 is now connected to the cell 102, this current is flowing into the cell 102. Hence, the battery cell 101 with the higher voltage is discharged with a current and the cell 102 with the lower voltage is charged with that current.

A disadvantage of the balancing circuit 300 is that it allows a transfer of energy and charge only between pairs of cell connected to the same inductance, which are usually neighboring cells of the battery 111. Thus, a series of charge transfer processes between neighboring cells of the battery 111 can be necessary for shifting energy and charge from the cell having the highest voltage to the cell having the lowest voltage. Since losses may occur in each of the charge transfer processes, this may lead to a relatively high loss of energy.

FIG. 4 shows yet another active battery balancing circuit 400 according to the state of the art.

The balancing circuit 400 comprises a transformer 401 having a primary winding 405 and a plurality of secondary windings 402, 403 that are wound around a common core. The primary winding 405 can be connected between the positive pole 112 and the negative pole 113 of the battery 111 by means of switch 408. The secondary windings 402, 403 can each be connected between the positive and negative pole of one of the cells 101, 102, and disconnected therefrom by means of a respective switch 406, 407. The switches 406, 407, 408 can be solid state switches, and can be controlled by a control unit (not shown).

The balancing circuit 400 can be used for selectively charging one of the cells 101, 102, for example, the cell having the lowest voltage. For this purpose, the switch 408 is closed while the switches 406, 407 are open. Thus, an electric current flows from entire battery 111 through the primary winding 405 of the transformer 401, and a magnetic field is built up in the core of the transformer 401. Thereafter, the switch 408 is opened, and a switch associated with the cell to be charged, for example, the switch 406 associated with cell 101, is closed. The energy stored in the magnetic field in the core of the transformer 401 creates a current in the secondary winding 402 that flows into the cell 101. Thus, the cell 101 is charged, and the charge in the other cells of the battery 111 is reduced.

Alternatively, the balancing circuit 400 can be used for selectively discharging one of the cells 101, 102 of the battery 111, for example the cell having the highest voltage, and charging the entire battery 111 with charge drawn from this cell. For example, for selectively discharging the cell 102, the switch 407 can be closed, with the switches 406, 408 being open. A current flows from the cell 102 through the secondary winding 403, and creates a magnetic field in the core of the transformer 401. Then, the switch 407 is opened, and the switch 408 is closed. The presence of the magnetic field in the core of the transformer 401 creates an electric current in the primary winding 405 of the transformer 401, and the energy stored in the magnetic field flows into the entire battery 111.

Thus, the balancing circuit 400 allows to selectively discharge cells of the battery 111 having a high voltage, for example during the charging of the battery 111, and to selectively charge cells of the battery 111 having a low voltage, for example during the discharge of the battery 111.

A problem of the balancing circuit 400 is, that the transformer 401 can be a relatively bulky component, in particular if the battery 111 comprises a large number of cells and, hence, the transformer comprises a large number of secondary coils.

Moreover, the voltage that is applied to the entire battery 111 when one of the cells is selectively discharged, and the voltage that is applied to a cell of the battery 111 when one of the cells is selectively charged, depend on the inductive coupling between the secondary windings 402, 403 and the primary winding 405. If there are differences in the inductive coupling of the individual secondary windings 402, 403 and the primary winding 405, voltage differences may occur in the selective discharging and charging of the cells 101, 102 of the battery 111. Thus, the balancing circuit 400 can contribute to the creation of different voltages of the cells 101, 102, rather than leading to an averaging of the voltages of the cells 101, 102. Therefore, the balancing circuit 400 may require a precise balancing of the inductive coupling between the primary winding 405 and the secondary windings 402, 403, which may increase the costs of the balancing circuit 400, in particular in case of a large number of secondary windings.

BRIEF SUMMARY

Some embodiments of the present disclosure provide an active balancing circuit, a power source comprising a battery and an active battery balancing circuit, and a method of balancing an electric charge in a plurality of cells of a battery wherein some or all of the above described problems of the state of the art can be overcome.

An active battery balancing circuit according to one embodiment of the present disclosure comprises an inductance, at least one first circuit portion, and a second circuit portion. The inductance has a first inductance terminal and a second inductance terminal. Each first circuit portion comprises a pair of battery subunit connection terminals comprising a first battery subunit connection terminal electrically connectable to a positive pole of a subset of a plurality of cells of a battery unit electrically connected in series, and a second battery subunit connection terminal electrically connectable to a negative pole of the subset. Additionally, each first circuit portion comprises first circuitry for allowing a current flow between the first battery subunit connection terminal and the first inductance terminal, through the inductance and between the second inductance terminal and the second battery subunit connection terminal. The first circuitry is adapted for allowing current flow through the first circuitry in one of a first direction and a second direction. The first direction is from the first inductance terminal to the second inductance terminal. The second direction is from the second inductance terminal to the first inductance terminal. The second circuit portion comprises a pair of battery unit connection terminals comprising a first battery unit connection terminal electrically connectable to a positive pole of the plurality of cells of the battery unit, and a second battery unit connection terminal electrically connectable to a negative pole of a plurality of cells of the battery unit. Additionally, the second circuit portion comprises second circuitry for allowing a current flow between the second battery unit connection terminal and the first inductance terminal, through the inductance and from the second inductance terminal to the first battery unit connection terminal. The second circuitry is adapted for allowing current flow through the second circuitry in the one of the first direction and the second direction. At least one of the first circuitry and the second circuitry comprises one or more switching elements that are switchable between an electrically conductive state and an electrically non-conductive state for alternately allowing current flow through the first circuitry of one of the at least one first circuit portion and the second circuitry in the one of the first and the second direction. Additionally, the active battery balancing circuit comprises a control unit for operating the one or more switching elements.

In the active battery balancing circuit according to one embodiment of the present disclosure, a current flow through a subset of the cells of the battery and the inductance can be obtained by operating one or more switching elements of the first circuit portion connected to the cell of the battery. Additionally, a current flow through the entire battery and the inductance can be obtained by means of the second circuit portion. Thus, energy from the entire battery, or from one of the cells of the battery, respectively, can be temporarily stored in a magnetic field created by an electric current flowing through the inductance, and can then be transferred to one or more of the cells of the battery, or the entire battery, respectively, by operating the one or more switching elements. Since energy is temporarily stored in an inductance, efficiency issues associated with capacitive battery balancing circuits as described above with respect to FIG. 1 can be avoided. Moreover, since energy is transferred between a subset of the cells of the battery, for example, a single cell, and the entire battery, the transfer of energy is not limited to a transfer between neighboring cells of the battery, as in the balancing circuit according to the prior art described above with respect to FIG. 3. Furthermore, issues associated with the use of a transformer circuit, as described above with reference to FIG. 4 can be avoided.

In some embodiments, the first circuitry comprises two switching elements. One of the switching elements of the first circuitry is connected between the first battery subunit connection terminal and the first inductance terminal. The other of the switching elements of the first circuitry is connected between the second battery subunit connection terminal and the second inductance terminal. The control unit is adapted for operating the switching elements of the first circuitry simultaneously.

Thus, an electrical connection between a subset of the cells of a battery connected between the battery subunit connection terminals of the first circuit portion wherein the first circuitry is provided and the inductance can quickly be provided or disconnected.

In some embodiments, the control unit is configured to switch the switching elements of the first circuitry into an electrically nonconductive state when a predetermined time after a switching of the switching elements into the electrically conductive state has expired and/or when a current flowing through the first circuitry in the one of the first and the second direction crosses a threshold value.

If the battery balancing circuit is operated for selectively discharging a subset of the cells of the battery, for example a single cell, the current flowing through the inductance increases with time when the switching elements of the first circuitry connected to the subset of the cells are closed, and would saturate at an amperage that depends on the ohmic resistance of the current path through the inductance and the first circuit portion. By switching the switching elements into the electrically nonconductive state, the current through the inductance can be controlled. In some embodiments, the discharge energy can be determined, and the coulomb counting algorithm can be used to calculate the state of charge of the battery. This information can be used to avoid an overload of the battery cells.

If the battery balancing circuit is used for discharging the entire battery and for selectively charging a subset of the cells of the battery, for example, a single cell, switching the switching elements of the first circuitry into the nonconductive state after a predetermined time or upon the crossing of a threshold value by the current flowing through the first circuitry can help to avoid that a current in the reverse direction starts to flow as soon as the voltage between the inductance terminals becomes smaller than the voltage of the subset of cells.

In some embodiments, the second circuitry comprises two diodes. One of the diodes is electrically connected between the second inductance terminal and the first battery unit connection terminal, with its forward direction being from the second inductance terminal to the first battery unit connection terminal. The other of the diodes is electrically connected between the second battery unit connection terminal and the first inductance terminal, with its forward direction being from the second battery unit connection terminal to the first inductance terminal.

The diodes allow a current flow from the inductance into the plurality of cells of the battery and prevent a current flow in the reverse direction. Thus, energy that has been discharged from a subset of the plurality of cells via the at least one first circuit portion can be returned to the entire plurality of cells via the second circuit portion, and a shortcut of the plurality of cells through the inductance can be avoided.

In some embodiments, the second circuitry comprises two switching elements. One of the switching elements of the second circuitry is electrically connected between the second inductance terminal and the first battery unit connection terminal. The other of the switching elements of the second circuitry is electrically connected between the second battery unit connection terminal and the first inductance terminal. The control unit is adapted for operating the switching elements simultaneously.

By closing the switching elements of the second circuitry, a current flow through the second circuit portion between the plurality of cells of the battery and the inductance can be obtained. This current flow can used for discharging energy from the plurality of cells that can later be used for selectively charging a subset of the plurality of cells, or for charging the plurality of cells with energy stored in the inductance.

In some embodiments, the control unit is configured to switch the switching elements of the second circuitry into the electrically conductive state when the switches of the first circuitry are switched into the electrically nonconductive state, and to switch the switching elements of the second circuitry into the electrically nonconductive state when a predetermined time after a switching of the switching elements of the second circuitry into the electrically conductive state has expired and/or the amperage of the current flowing through the second circuitry in the one of the first and the second direction crosses a threshold value.

If the battery balancing circuit is used for selectively discharging a subset of the cells of the battery, energy from the subset is transferred to the inductance while the switches of the first circuitry are in the electrically conductive state. Switching the switching elements of the second circuitry into the electrically conductive state when the switching elements of the first circuitry are switched into the electrically nonconductive state allows transferring the energy temporarily stored in the inductance to the plurality of cells of the battery. By switching the switching elements of the second circuitry into the electrically nonconductive state after a predetermined time, or upon the crossing of a threshold value, an undesirable current flow through the inductance in the reverse direction can be avoided.

If the battery balancing circuit is used for discharging the plurality of cells of the battery, and for selectively charging a subset of the cells, switching the switching elements of the second circuitry into the electrically nonconductive state after a predetermined time or upon the crossing of a threshold value allows to limit the current flow through the inductance, and switching the switching elements of the second circuitry into the electrically conductive state upon the switching of the switches of the first circuitry into the electrically nonconductive state allows to start a new charge/discharge cycle as soon as the energy from the inductance has been transferred to the subset of cells.

In some embodiments, wherein the balancing circuit comprises a plurality of first circuit portions, the control unit is configured for measuring a voltage between the first and the second battery subunit connection terminals of the first circuitry of each of the first circuit portions, and for operating the at least one switching element of the first circuitry of the one of the first circuit portions wherein the greatest or smallest voltage is measured. Thus, the subset of the cells of the battery connected to the first circuit portion wherein the greatest or smallest voltage is measured (which may be indicative of a particularly high or low state of charge) can be selectively discharged or charged, respectively.

In some embodiments, wherein the balancing circuit comprises a plurality of first circuit portions, the control unit is configured for sequentially selecting each of the first circuit portions, and for operating the switching elements of the first circuitry of the respective first circuit portion.

Since the amount of charge that flows between the inductance and the subset of the cells of the battery when the subset is connected to the inductance depends on the voltage of the subset of cells, and may also depend on the internal resistance of the cells, a leveling of the state of charge of the individual subset of cells can be obtained by sequentially operating the switching elements of the first circuitry in each of the first circuit portions. Thereby, circuit elements for measuring the voltage between the first and the second battery subunit connection terminals are not necessary.

In some embodiments, the control unit is configured to switch the switching elements of the first circuitry that are operated into the electrically conductive state when the amperage of the current flowing through the second circuitry in the one of the first and the second direction crosses a threshold value and/or when a predetermined time has expired after a switching of these switching elements into the electrically nonconductive state. Thus, a next charge/discharge cycle of the inductance can be started.

A power source according to one embodiment of the present disclosure comprises a battery comprising a plurality of cells electrically connected in series, and an active battery balancing circuit as described above. The number of first circuit portions of the active battery balancing circuit is equal to a number of cells of the battery. The first and the second battery subunit connection terminals of each of the first circuit portions are electrically connected to a positive and a negative pole, respectively, of one of the cells of the battery. The first and second battery unit connection terminals of the second circuit portion are connected to a positive and a negative pole, respectively, of the battery. By means of the active battery balancing circuit, an efficient charge balancing of the cells of the battery can be performed.

A method of balancing an electric charge in a plurality of cells of a battery that are electrically connected in series according to the present disclosure comprises electrically connecting a first subset of the cells of the battery to an inductance for providing a current flow from the first subset through the inductance. The first subset of the cells is disconnected from the inductance, and a current is allowed to flow from the inductance into a second subset of the cells of the battery. At least one of the first and the second subset of the cells of the battery comprises two or more cells.

In some embodiments, the first subset of the cells of the battery comprises a single cell, and the second subset of the cells of the battery comprises two or more cells and/or all cells of the battery.

In some embodiments, one of the cells of the battery that has the greatest voltage and/or the highest state of charge is selected, and the selected cell forms the first subset of the cells of the battery.

In some embodiments, the steps of electrically connecting the first subset of the cells of the battery to the inductance for providing a current flow from the first subset through the inductance, disconnecting the first subset of the cells from the battery and allowing a current flow from the inductance into a second subset of the cells of the battery are repeated at least once.

In some embodiments, the repetition is started when the amperage of the current into the second subset of cells falls below a threshold value and/or when a predetermined time has expired after the start of the current flow into the second subset of the cells of the battery.

In some embodiments, the first subset of the cells of the battery comprises two or more and/or all cells of the battery, and the second subset of the cells of the battery comprises a single cell, in particular the cell having the lowest voltage and/or the lowest state of charge.

BRIEF DESCRIPTION OF THE SEVERAL VIEWS OF THE DRAWINGS

Embodiments of the present disclosure will now be described with reference to the figures, wherein.

DETAILED DESCRIPTION

Figure 5:
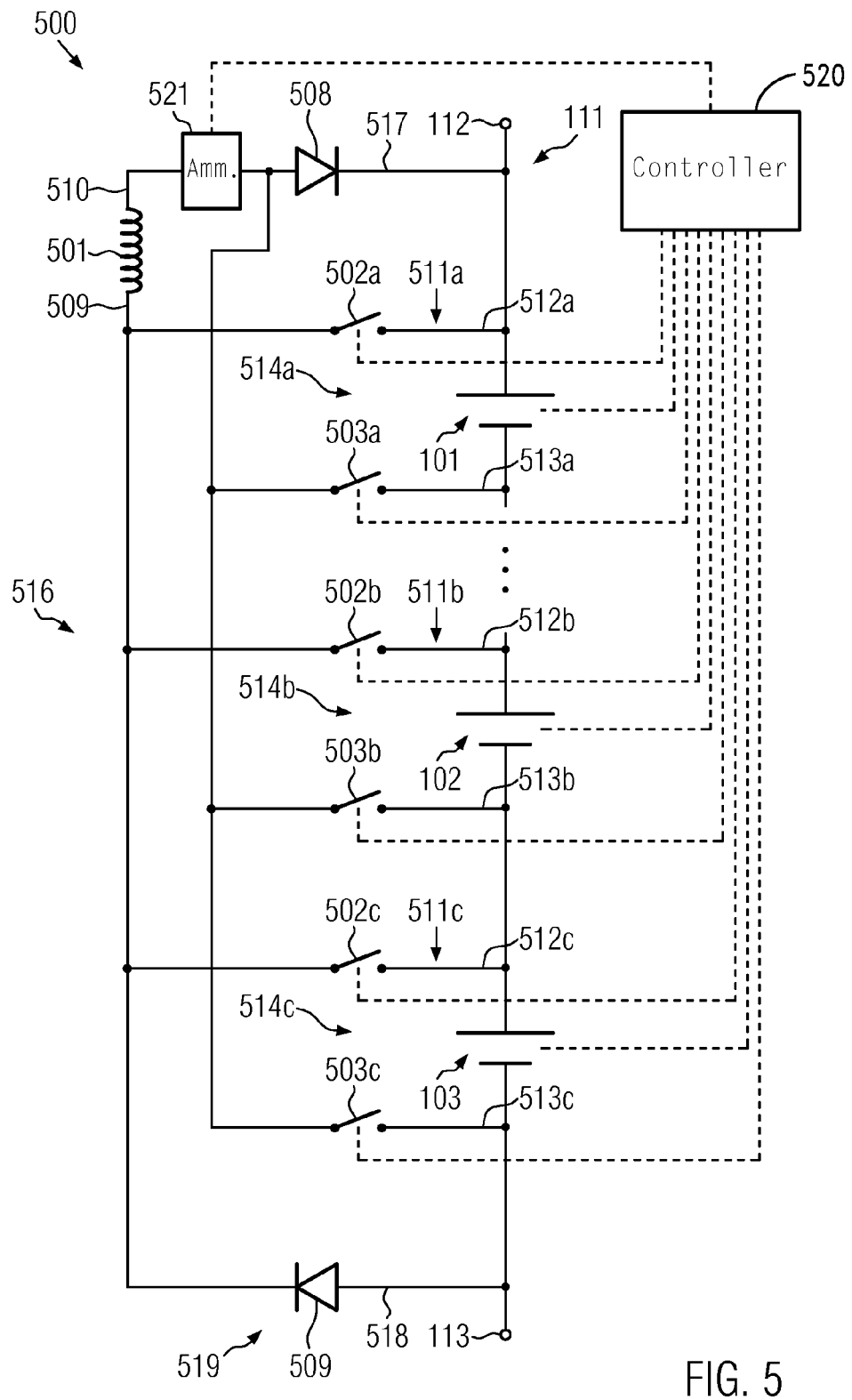
FIG. 5 shows an active battery balancing circuit according to an embodiment of the present disclosure.

FIG. 5 shows a schematic circuit diagram of a power source comprising a battery 111 and an active battery balancing circuit 500. The battery 111 comprises a plurality of cells 101, 102, 103 that are electrically connected in series between a positive pole 112 and a negative pole 113 of the battery 111. Each of the cells 101, 102, 103 has a positive pole and a negative pole. In FIG. 5, the cells 101, 102, 103 are depicted by conventional circuit symbols, wherein a longer line denotes the positive pole and a shorter line denotes the negative pole.

The battery 111 need not comprise three cells, as shown in FIG. 5. In other embodiments, a different number of cells can be used. The number of cells of the battery 111 can generally be two or more. While a relatively small number of cells can be used in applications wherein only a relatively small voltage is used, for example, in battery packs for digital cameras and portable computers, in other embodiments, a relatively large number of cells can be used. For example, the battery 111, when used as energy storage for the electrical drive train of an electric vehicle or a hybrid vehicle can comprise up to several hundred individual cells.

In some embodiments, the cells 101, 102, 103 of the battery 111 can be lithium ion battery cells. However, the present disclosure is not limited to embodiments wherein lithium ion battery cells are used. In other embodiments, the cells 101, 102, 103 can be cells of a different type, for example lead acid cells, nickel cadmium cells or nickel metal hydride cells.

The active battery balancing circuit 500 comprises an inductance 501. The inductance 501 can be a coil and can, in some embodiments, have a core comprising a ferromagnetic material that can comprise iron, nickel, cobalt or an alloy thereof, or a ferrite material.

The inductance 501 has a first inductance terminal 509 and a second inductance terminal 510. In embodiments wherein the inductance 501 comprises a coil, the first inductance terminal 509 and the second inductance terminal 510 can be ends of a coil wire of the coil, or lead wires and/or circuit paths on a printed circuit board electrically connected thereto.

The active battery balancing circuit 500 further comprises a plurality of first circuit portions 511a, 511b, 511c. For convenience, components of the first circuit portions 511b, 511c are denoted by reference numerals corresponding to those of the first circuit portion 511a, with the trailing "a" being replaced by a trailing "b" or "c", and a detailed description thereof will be omitted. Unless explicitly stated otherwise, components of the first circuit portions 511b, 511c can have features corresponding to those of corresponding components of the first circuit portion 511a denoted by a corresponding reference numeral.

The first circuit portion 511a comprises a first battery subunit connection terminal 512a and a second battery subunit connection terminal 513a. The first battery subunit connection terminal 512a is electrically connectable to a subset of a plurality of cells of a battery unit electrically connected in series. The second battery subunit connection terminal 513a is electrically connectable to a negative pole of the subset of the plurality of cells of the battery unit The first and second battery subunit connection terminals 512a, 513a can, in some embodiments, be provided in the form of wires, circuit paths on a printed circuit board, pins of a housing of an integrated circuit, a plug, a jack, or a pin or electrical contact in a plug or jack.

The first battery subunit connection terminal 512a and the second battery subunit connection terminal 513a of the first circuit portion 511a can be connected to the positive pole and the negative pole, respectively, of a single cell 101 of the battery 111. Similarly, the battery subunit connection terminals 512b, 513b of the first circuit portion 511b can be connected to cell 102 of the battery 111, and the battery subunit connection terminals 512c, 513c of the first circuit portion 511c can be connected to cell 103.

Generally, the number of first circuit portions of the active battery balancing circuit 500 can, in some embodiments, be equal to the number of cells of the battery 111, and the battery subunit connection terminals of each of the first circuit portions can be connected to the poles of one of the cells of the battery.

However, the present disclosure is not limited to such embodiments. In other embodiments, the battery subunit connection terminals 512a-c, 513a-c, of each of the first circuit portions 511a to 511c can be connected to a subset of the cells of a battery comprising two or more cells, in particular, two or more adjacent cells of the battery 111 that are electrically connected to each other in series. In such embodiments, the electric charge of the battery 111 can be balanced between the subsets of the plurality of cells, whereas charge balancing within the subsets can be omitted, or can be performed by means of other balancing circuits associated with each of the subsets.

In the following, the term "subset" will be used both for denoting a set comprising two or more cells of the battery 111, as well as for denoting a single cell of the battery 111, i.e., a subset of the cells of the battery 111 that consists of a single cell.

The first circuit portion 511a further comprises first circuitry 514a. The first circuitry 514a allows a current flow between the first battery subunit connection terminal 512a and the first inductance terminal 509, through the inductance 501 and between the second inductance terminal 510 and the second battery subunit connection terminal 513a. In some embodiments, the first circuitry 514a can be adapted for allowing current flow in both directions, whereas in other embodiments, the first circuitry 514a can be adapted for allowing current flow in only one direction.

In the following, current flow through the first circuitry 514a wherein the technical current direction is from the first inductance terminal 509 to the second inductance terminal 510 will be denoted as a current flow in a first direction and current flow through the first circuitry 514a wherein the technical current direction is from the second inductance terminal 510 to the first inductance terminal 509 will be denoted as current flow in a second direction.

Similarly, each of the first circuit portions 511b, 511c comprises first circuitry 514b, 514c, for allowing a current flow between the first battery subunit connection terminal of the respective first circuit portion and the first inductance terminal 509, through the inductance 501 and between the second inductance terminal 510 and the respective second battery subunit connection terminal. Current flow will be denoted as being in the first direction if the technical current direction is from the first inductance terminal 509 to the second inductance terminal 510, and in the second direction if the technical current direction is from the second inductance terminal 510 to the first inductance terminal 509.

Since the first battery subunit connection terminals 512a, 512b, 512c of the first circuit portions 511a, 511b, 511c are connected to positive poles of subsets of the cells of the battery 111 and the second battery subunit connection terminals 513a, 513b, 513c are connected to negative poles of subsets of the cells of the battery 111, a current through one of the first circuitries 514a, 514b, 514c in the first direction discharges the subset of the cells of the battery 111 connected to the respective first circuit portion, and a current flowing through one of the first circuitries 514a, 514b, 514c in the second direction charges the subset of the cells of the battery 111 connected to the respective first circuit portion.

The first circuit portion 511a can further comprise switching elements 502a, 503a. The switching element 502a is electrically connected between the first battery subunit connection terminal 512a and the first inductance terminal 509, and the switching element 503a is electrically connected between the second battery subunit connection terminal 513a and the second inductance terminal 510. Each of the switching elements 502a, 503a can be switched between an electrically conductive state and an electrically non-conductive state. If the switching elements 502a, 503a are in the electrically conductive state, an electrical current can flow through the first circuit portion 511a, the inductance 501 and the cell 101 electrically connected between the battery subunit connection terminals 512a, 513a. If the switching elements 502a, 503a are in the electrically non-conductive state, such current flow is not possible.

In some embodiments, the switching elements 502a, 503a can be solid state switches. For example, each of the switching elements 502a, 503a can comprise MOS-transistors in an anti-serial configuration. In other embodiments, different solid state switching elements, for example bipolar transistors, can be used for the switching elements 502a, 503a, or ultra fast switching mechanical elements can be used.

In some embodiments, the switching elements 502a, 503a can be adapted for allowing current flow in only one direction when they are in the electrically conductive state. In other embodiments, the switching elements 502a, 503a can transmit an electrical current in both directions when they are in the electrically conductive state.

Similarly, the first circuitry 514b of the first circuit portion 511b comprises switching elements 502b, 503b, and the first circuitry 514c of the first circuit portion 511c comprises switching elements 502c, 503c.

The battery balancing circuit 500 further comprises a control unit 520 which can, for example, comprise a known microcontroller.

The control unit 520 can be adapted for operating each of the switching elements 502a, 502b, 502c, 503a, 503b and 503c. For this purpose, the switching elements 502a, 502b, 502c, 503a, 503b, 503c can be connected to the control unit 520, as schematically illustrated by dashed lines between the switching elements 502a, 502b, 502c, 503a, 503b, 503c and the control unit 520 in FIG. 5.

The balancing circuit 500 further comprises a second circuit portion 516. The second circuit portion 516 comprises a first battery unit connection terminal 517 and a second battery unit connection terminal 518. The first battery unit connection terminal 517 is electrically connectable to the positive pole 112 of the battery 111, and the second battery unit connection terminal 518 is electrically connectable to the negative pole 113 of the battery 111.

The second circuit portion 516 comprises second circuitry 519 for allowing a current flow between the second battery unit connection terminal 518 and the first inductance terminal 509, through the inductance 501, and between the second inductance terminal 510 and the first battery unit connection terminal 517.

The second circuitry can comprise diodes 508, 509. Diode 508 is electrically connected between the second inductance terminal 510 and the first battery unit connection terminal 517, with its forward direction being from the second inductance terminal 510 to the first battery unit connection terminal 517. Diode 509 is electrically connected between the second battery unit connection terminal 518 and the first inductance terminal 509, with its forward direction being from the second battery unit connection terminal 518 to the first inductance terminal 509.

Due to the presence of the diodes 508, 509, the second circuitry 519 allows a current flow through the second circuit portion 516 in the first direction, wherein the technical current direction in the inductance 501 is from the first inductance terminal 509 to the second inductance terminal 510, but does not allow a current flow through the second circuit portion 516 in the second direction. For this purpose, the diodes 508, 509 can have a breakthrough voltage that is greater than the voltage occurring between the first pole 112 and the second pole 113 of the battery 111 during the operation of the battery 111, in particular, during charge and discharge of the battery 111. Alternatively, a plurality of diodes electrically connected in series can be used.

Since the second circuitry 519 electrically connects the second battery unit connection terminal 518 that is connectable to the negative pole 113 of the battery 111, with the first inductance terminal 509 and connects the second inductance terminal 510 with the first battery unit connection terminal 517 connected to the positive pole 112 of the battery 111, a current flow through the second circuit portion 516 in the first direction charges the cells 101, 102, 103 of the battery 111, and a current flow through the second circuit portion 516 in the second direction discharges the cells 101, 102, 103 of the battery.

The active battery balancing circuit 500 can, in some embodiments, further comprise means 521 for measuring an amperage of the current flowing through the inductance 501. For this purpose, the means 521 for current measurement can be provided in a portion of the active battery balancing circuit 500 that is common to each of the first circuitries 514a, 514b, 514c and the second circuitry 519, such that an amperage of the current flowing through the inductance 501 can be measured, irrespectively of whether the current is flowing through one of the first circuitries 514a, 514b, 514c, or through the second circuitry 519. The means 521 can be connected to the control unit 520 such that the control unit 520 can operate the switches 502a, 503a, 502b, 503b, 502c, 503c on the basis of the amperage of the current flowing through the inductance 501.

A method of balancing electric charge in the cells 101, 102, 103 of the battery 111 that can be performed by means of the balancing circuit 500 described above with reference to FIG. 5 will now be described with reference to FIG. 7.

Figure 7:
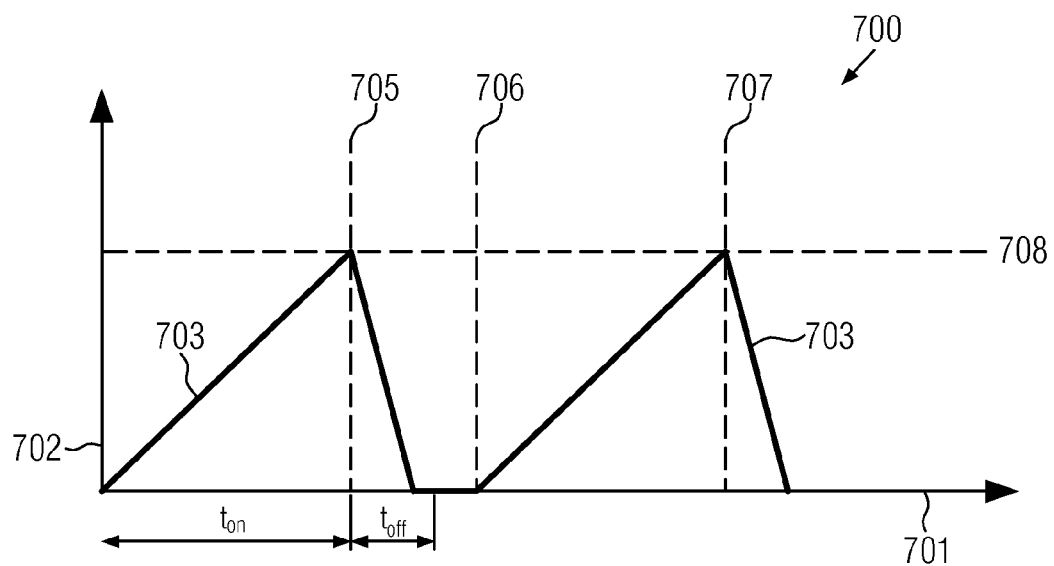
FIGS. 7, 8, 9 and 10 show diagrams illustrating current flow through an inductance in an active battery balancing circuit according to the present disclosure.

FIG. 7 shows a diagram 700 wherein a curve 703 illustrates a current flowing though the inductance 501 that can be measured, for example, with the means 521 for measuring a current. A horizontal coordinate axis 701 denotes time and a vertical coordinate axis denotes amperage.

In the following, the amperage of the current through the inductance 501 will be said to have a positive sign, if the current flows in the first direction (i.e., the technical current direction is from the first inductance terminal 509 to the second inductance terminal 510), and will said to have a negative sign if the current flow is in the second direction (i.e., the technical current direction is from the second inductance terminal 510 to the first inductance terminal 509).

A subset of the cells 101, 102, 103 of the battery 111 that is electrically connected between the battery subunit connection terminals of one of the first circuit portions 511a, 511b, 511c is selected.

In embodiments wherein each subset of cells connected between the battery subunit connection terminals of the first circuit portions 511a, 511b, 511c comprises a single cell, the selection of a subset of the cells 101, 102, 103 of the battery 111 comprises a selection of one of the cells of the battery 111. In embodiments wherein subsets comprising more than one cell are connected between the battery subunit connection terminals of the first circuit portions 511a, 511b, 511c, one of these subsets can be selected.

The selection of a subset of the cells of the battery 111 can be performed by the control unit 520.

In some embodiments, the control unit 520 can sequentially select each of the subsets of the cells, by sequentially using each of the first circuit portions 511a, 511b, 511c. For example, first a charge balancing process can be performed on the basis of a selection of cell 101, using the first circuit portion 511a as described in more detail below. Thereafter, a charge balancing process can be performed on the basis of a selection of cell 102, using first circuit portion 511b, and then a charge balancing process can be performed on the basis of a selection of cell 103, using the first circuit portion 511c. Subsequently, the sequence of performing charge balancing processes on the basis of a sequential selection of cells 101, 102, 103 can be repeated.

In other embodiments, the control unit 520 can select the one of the first circuit portions 511a, 511b, 511c wherein the greatest voltage is present between the first battery subunit connection terminal and the second battery subunit connection terminal. Thus, one of the subsets of cells connected between the battery subunit connection terminals of the first circuit portions 511a, 511b, 511c that has the greatest voltage can be selected. For this purpose, the control unit 520 can comprise voltage measuring means configured for measuring a voltage between the first battery subunit connection terminal and the second battery subunit connection terminal of each of the first circuit portions 511a, 511b, 511c, or can be connected to separate circuitry adapted for this purpose. For measuring voltages between battery subunit connection terminals of the first circuit portions 511a, 511b, 511c, known voltage measurement circuits can be employed. In FIG. 5, connections between the first circuit portions 511a, 511b, 511c for measuring voltages between the first and second battery connection terminals are schematically illustrated by dashed lines.

The switching elements of the selected first circuit portion are operated. In the following, as an example, a case wherein the first circuit portion 511a is selected will be described. In cases wherein the first circuit portion 511b or the first circuit portion 511c is selected, the balancing process is performed in a similar manner, wherein components of the first circuit portion 511b or components of the first circuit portion 511c that are denoted by corresponding reference numerals are operated instead of components of the first circuit portion 511a.

First, the switching elements 502a, 503a of the selected first circuit portion 511a are switched into the electrically conductive state. For this purpose, the control unit 520 can apply a control signal to the switching elements 502a, 503a. Thus, an electrical connection between the first battery subunit connection terminal 512a connected to the positive pole of the cell 101 and the first inductance terminal 509, and an electrical connection between the second battery subunit connection terminal 513a connected to the negative pole to the cell 101 and the second inductance terminal 510 is established. Thus, a flow of a current from the cell 101 through the inductance 501 is obtained.

The current flow through the inductance 501 leads to a creation of a magnetic field in the inductance 501 which, in turn, induces a voltage between the first inductance terminal 509 and the second inductance terminal 510 in a direction opposite to that of the current flow through the inductance 501. This voltage limits the increase of the current through the inductance 501. Since the first battery subunit connection terminal 512a is connected to the positive pole of the cell 101, and the second battery subunit connection terminal 513a is connected to the negative pole of the cell 101, the current through the inductance 501 is in the first direction, such that a positive amperage of the current through the inductance 501 increasing with time after the switching of the switching elements 502a, 503a into the electrically conductive state is obtained, as illustrated by the portion of curve 703 in FIG. 7 on the left side of dashed line 705.

At a point of time denoted by dashed line 705 in FIG. 7, the switching elements 502a, 503a of the selected first circuit portion 511a are switched into the electrically non-conductive state.

In some embodiments, the switching elements 502a, 503a can be switched into the electrically non-conductive state when the current through the inductance 501 reaches a threshold value that is denoted by dashed line 708 in FIG. 7. For this purpose, the control unit 520 can monitor the current through the inductance 501 by means of the current measuring means 521, and can switch the switching elements 502a, 503a into the electrically non-conductive state as soon as the measured current exceeds the threshold value 708.

In other embodiments, the switching elements 502a, 503a can be switched into the electrically non-conductive state when a predetermined time has expired after the switching of the switching elements 502a, 503a into the electrically conductive state.

After the switches 502a, 503a are switched into the electrically non-conductive state, the current through the inductance 501 does not stop immediately. Instead, a current continues to flow until the energy stored in the magnetic field that was created in the inductance 501 by the current from the cell 101 is removed from the inductance 501. Since the diodes 508, 509 transmit a current flowing through the second circuitry 519 in the first current direction, the current flowing through the inductance 501 flows through the second circuitry 519 after the switching elements 502a, 503a are switched into the electrically non-conductive state. The current flows through the battery unit connection terminals 517, 518 into each of the cells 101, 102, 103 that are electrically connected in series between the positive pole 112 and the negative pole 113 of the battery 111. Thus, each of the cells, 101, 102, 103 of the battery 111 is charged.

While the current from the inductance 501 flows into the battery 111, the amperage of the current through the inductance 501 decreases. However, the current through the inductance 501 does not become smaller than zero, i.e., no current flow from the battery 111 through the inductance 501 in the second direction is obtained, since the diodes 508, 509 prevent a current flow through the second circuitry 519 into the second direction.

While the switching elements 502a, 503a are in the electrically conductive state, energy is transferred from the cell 101 into the inductance 501, and temporarily stored in the inductance 501. When the switching elements 502a, 503a are subsequently switched into the electrically non-conductive state, and current flow from the inductance 501 into the battery 111 through the battery unit connection terminals 517, 518 is obtained, the energy is distributed over the cells 101, 102, 103 of the battery 111 and stored in the cells 101, 102, 103 in the form of an electric charge. Hence, cell 101 is selectively discharged when the switching elements 502a, 503a are in the electrically conductive state, and each of the cells 101, 102, 103 is charged after the switching elements 502a, 503a are switched into the electrically non-conductive state. Thereby, the charge in the cell 101 decreases, and the state of the charge of cells 102, 103 increases.

At a point of time denoted by dashed line 706 in FIG. 7, the switching elements 502a, 503a of the first circuit portion 511a, or the switching elements of one of the other first circuit portions 511b, 511c can be switched into the electrically conductive state, and can be switched back into the electrically non-conductive state at a point of time denoted by dashed line 707 in FIG. 7, wherein the point of time 707 can, in some embodiments, be a point of time at which the current through the inductance 501 reaches the threshold voltage 708, or a point of time that is a predetermined time after the point of time 706. Thereafter, current flow from the inductance 501 into the battery 111 is obtained. Thus, the selective discharging of one of the cells 101, 102, 103 of the battery 111 and the charging of the entire battery 111 can be repeated.

Since the cells 101, 102, 103 of the battery 111 are electrically connected in series, the voltage obtained between the positive pole 112 and the negative pole 113 of the battery 111 is substantially equal to the sum of the voltages of each of the cells 101, 102, 103 and, hence, is greater than the voltage of each subset of the cells 101, 102, 103. In particular, the voltage between the positive pole 112 and the negative pole 113 of the battery 111 is greater than the voltage between the positive and the negative pole of the cell 101 from which the energy is transferred to the inductance 501 when the switching elements 502a, 503a are in the electrically conductive state.

Due to the conservation of energy, a ratio between a time $t_{on}$ during which current flows from the cell 101 into the inductance 501, and a time $t_{off}$ during which current flow from the inductance 501 into the battery 111, is approximately equal to a ratio of the voltage of the cell 101 that is discharged when the switching elements 502a, 503a are in the electrically conductive state, and the voltage of the entire battery 111.

Hence, the time during which one of the cells of the battery 111 is discharged is longer than the time during which current flows from the inductance 501 into the battery 111 and the battery 111 is charged. Thus, a relatively high amount of time can be used for discharging one of the cells 101, 102, 103 of the battery 111, in particular, for discharging the cell having the highest voltage.

Figure 1:
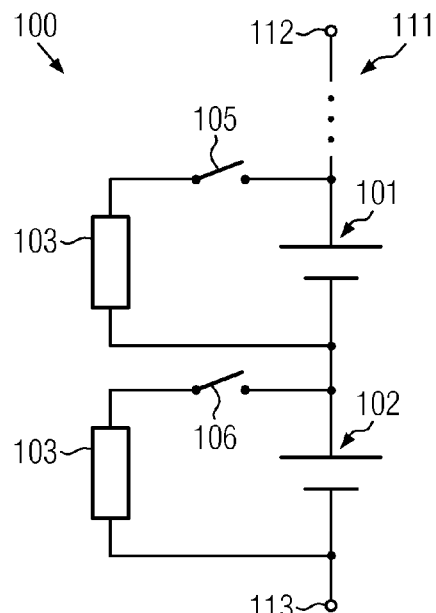
FIG. 1 shows a passive battery balancing circuit according to the state of the art.
Figure 2:
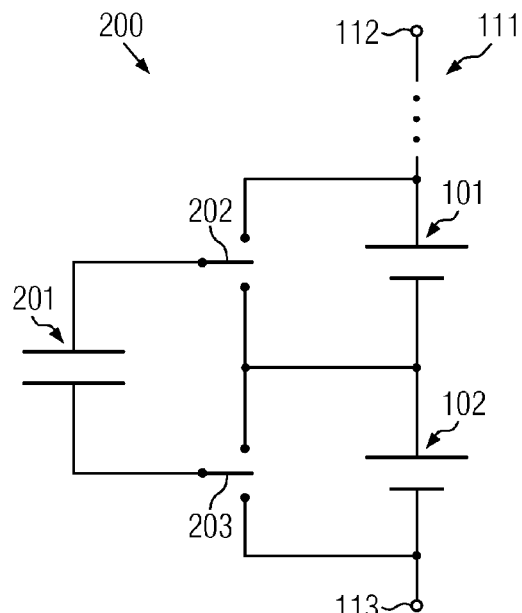
FIG. 2 shows an active battery balancing circuit according to the state of the art.
Figure 3:
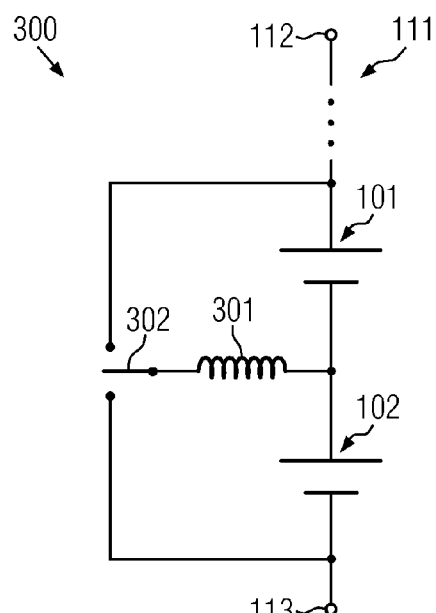
FIG. 3 shows another active battery balancing circuit according to the state of the art.
Figure 4:
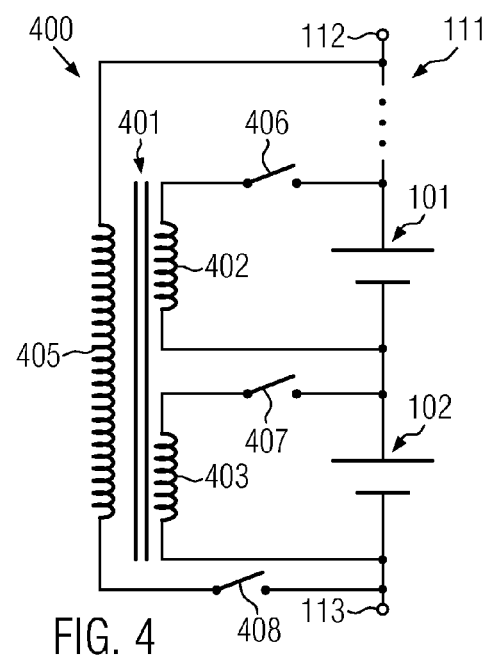
FIG. 4 shows yet another active battery balancing circuit according to the state of the art.

To the contrary, in active battery balancing circuits according to the state of the art as described above with reference to FIGS. 2, 3 and 4, the time for discharging one of the cells of the battery and the time for returning the energy discharged from this cell to the entire battery or to another cell of the battery are substantially equal. Hence, the present disclosure allows a shortening of the amount of time for evenly distributing charge over the cells 101, 102, 103 of the battery 111.

In some embodiments of the present disclosure, the time interval between the point of time 705 at which the switches 502a, 503a are switched from the electrically conductive state into the electrically non-conductive state, and the point of time 706, at which the switches 502a, 503a, or the switches of one of the other first circuit portions 511b, 511c are switched into the electrically conductive state for starting the next battery balancing cycle can be longer than the amount of time $t_{off}$ for the energy stored in the inductance 501 to flow into the battery 111 via the second circuitry 519. Thus, the charge balancing is performed in a discontinuous mode, wherein the current through the inductance 501 is substantially zero for an amount of time between subsequent cycles of the battery balancing process.

In other embodiments, the balancing process can be performed in a continuous mode, wherein the current flow through the inductance 501 remains greater than zero during the entire balancing process. Such embodiments will be explained in more detail with reference to FIG. 8.

Figure 8:
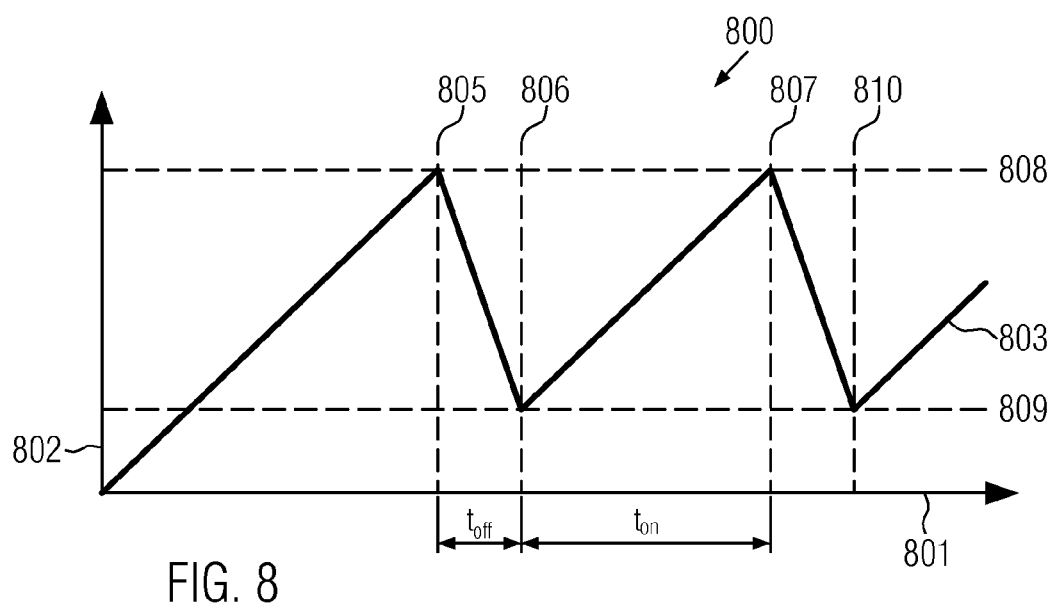

FIG. 8 shows a curve 803 illustrating current through the inductance 501. A horizontal coordinate axis 801 denotes time and a vertical coordinate axis 802 denotes the amperage of the current through the inductance 501.

At the beginning of the balancing process, the switches of one of the first circuit portions 511a, 511b, 511c, for example, the switching elements 502a, 503a of the first circuit portion 511a, are switched into the electrically conductive state, either for a predetermined amount of time, or until the amperage of the current has reached a threshold value 808. Thereafter, the switching elements 502a, 503a are switched into the electrically non-conductive state and current flow from the inductance 501 into the entire battery 111 is obtained. At a point of time 806, wherein the time interval between the point of time 805 and the point of time 806 is shorter than the time for the current from the inductance 501 to drop to zero, the switching elements 502a, 503a, or the switches of another one of the first circuit portions 511b, 511c are switched into the electrically conductive state, and the charge balancing process is repeated.

In some embodiments, the point of time 806 can be given by the expiry of a predetermined time after the point of time 805. In other embodiments, the point of time 806 can be given by the crossing of a threshold value 809 that is smaller than the threshold value 808 of the current through the inductance 501.

Performing a battery balancing process in the continuous mode wherein there are substantially no interruptions of the current flow through the inductance 501 can help to speed up the charge balancing process.

Figure 6:
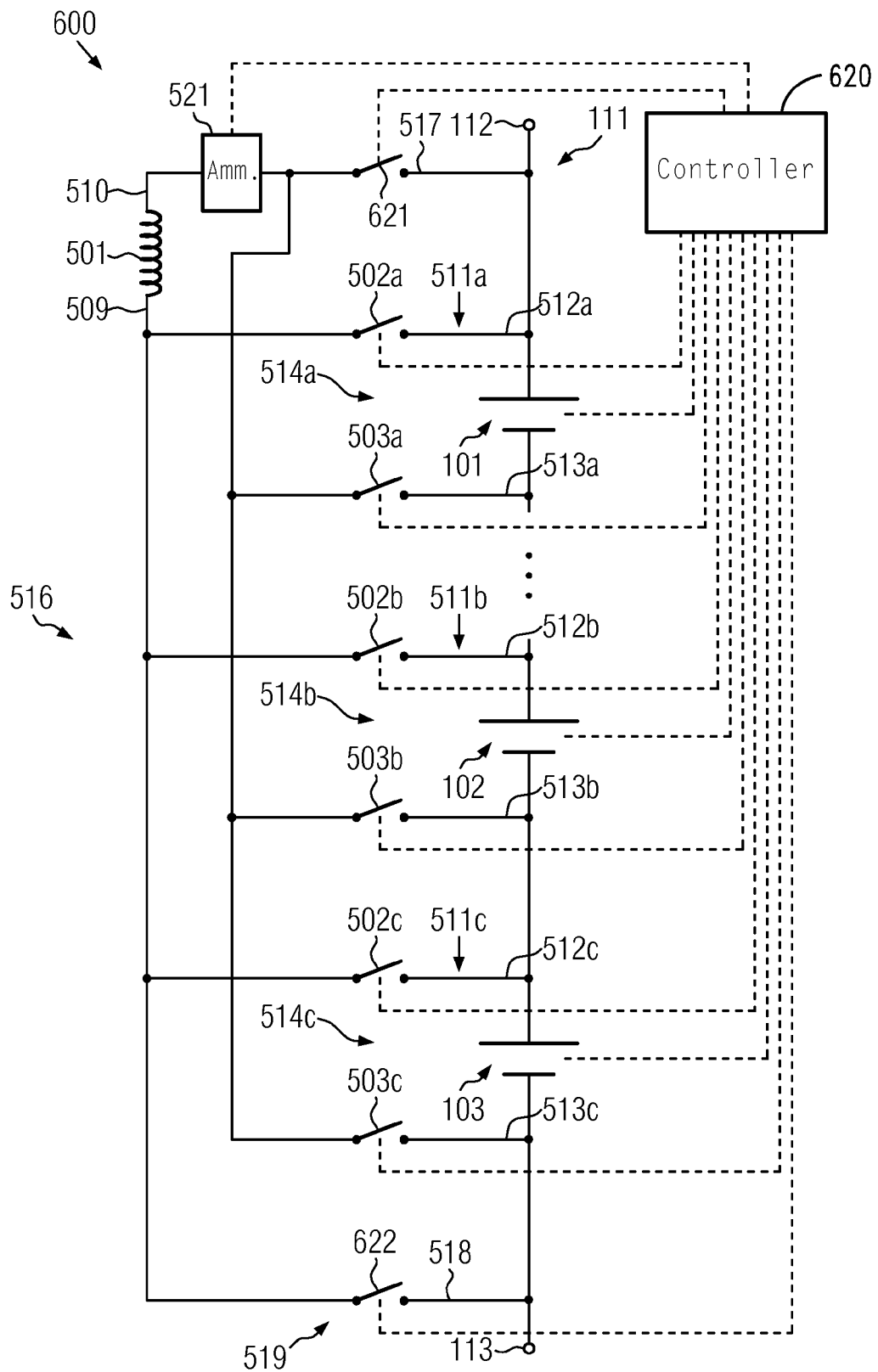
FIG. 6 shows an active battery balancing circuit according to another embodiment of the present disclosure.

FIG. 6 shows a schematic circuit diagram of an active battery balancing circuit 600 according to another embodiment of the present disclosure. For convenience, in FIGS. 5 and 6, like reference numerals have been used to denote like components, and features of components of the active battery balancing circuit 600 can correspond to those of corresponding components of the active battery balancing circuit 500 described above with reference to FIG. 5 and denoted by like reference numerals. For convenience, a detailed description thereof will be omitted.

In the active battery balancing circuit 600, the second circuitry 519 comprises switching elements 621, 622 instead of the diodes 508, 509 described above with reference to FIG. 5. The switching elements 621, 622 can be switched between an electrically conductive state and an electrically non-conductive state. Similar to the switching elements 502a, 503a, 502b, 503b, 502c, 503c of the first circuit portions 511a, 511b, 511c, the switches 621, 622 can be solid state switches that may, for example, comprise one or more transistors, or can be electromechanical switches such as, for example, relay switches.

The active battery balancing circuit 600 comprises a control unit 620 that is adapted for operating the switches 621, 622. For this purpose, the control unit 620 can be connected to each of the switches 621, 622, as schematically illustrated by dashed lines in FIG. 6. Other features of the control unit 620 can correspond to those of the control unit 520 described above with reference to FIG. 5, and a detailed description thereof will be omitted for convenience.

In a method of balancing an electric charge between the cells 101, 102, 103 of a battery 111 that is electrically connected to the battery balancing circuit 600 in a manner similar to the connection to the battery balancing circuit 500 described above with reference to FIG. 5, the switching elements of one of the first circuit portions 511a, 511b, 511c can be switched into the electrically conductive state for creating an electric current from one or more cells of the battery 111 connected between the battery subunit connection terminals of the first circuit portion through the inductance 501 in the first direction. While the switching elements of the first circuit portion are in the electrically conductive state, the switching elements 621, 622 of the second circuitry 519 are maintained in the electrically non-conductive state such that current flow is obtained only in the first circuit portion.

When the switching elements of the first circuit portion are switched into the electrically non-conductive state, either upon the expiry of a predetermined time after the switching of the switching elements of the first circuit portion into the electrically conductive state or upon a crossing of a threshold value 708 by the amperage of the current through the inductance 501, the switching elements 621, 622 of the second circuitry 519 are simultaneously switched into the electrically conductive state. For this purpose, the control unit 620 can comprise circuitry that applies a signal to the switching elements 621, 622 for switching the switching elements 621, 622 into the electrically conductive state when switches 502a, 503a, 502b, 503b, 502c, 503c receive a signal for switching to the electrically non-conductive state.

Thus, the current from the inductance 501 can flow through the switching elements 621, 622 into the entire battery 111 via the first battery unit connection terminal 517 and the second battery unit connection terminal 518.

The active battery balancing circuit 600 can be used both for performing a discontinuous balancing process as described above with reference to FIG. 7, and for performing a continuous balancing process as described above with reference to FIG. 8.

In a discontinuous balancing process as described above with reference to FIG. 7, the control unit 620 can switch the switching elements 621, 622 into the electrically non-conductive state as soon as the amperage of the current through the inductance 501 falls below a threshold value of zero. Thus, a current flow through the inductance 501 in the second direction can be prevented, in a manner similar to that obtained by using the diodes 508, 509 in the active battery balancing circuit 500 described above with reference to FIG. 5.

In a continuous battery balancing process as described above with reference to FIG. 8, the switching elements 621, 622 can be switched from the electrically conductive state into the electrically non-conductive state at the same point of time 806, 810 at which the switching elements of the one of the first circuit portions connected to the selected one of the cells of the battery 111 are switched into the electrically conductive state.

Compared to the diodes 508, 509 described above with reference to FIG. 5, the switches 621, 622 can have a smaller resistance, such that the active battery balancing circuit 600 can allow a more efficient battery balancing.

A further method of balancing an electric charge in a plurality of cells of the battery 111 that can be performed by means of the active battery balancing circuit 600 will be described with reference to FIG. 9.

Figure 9:
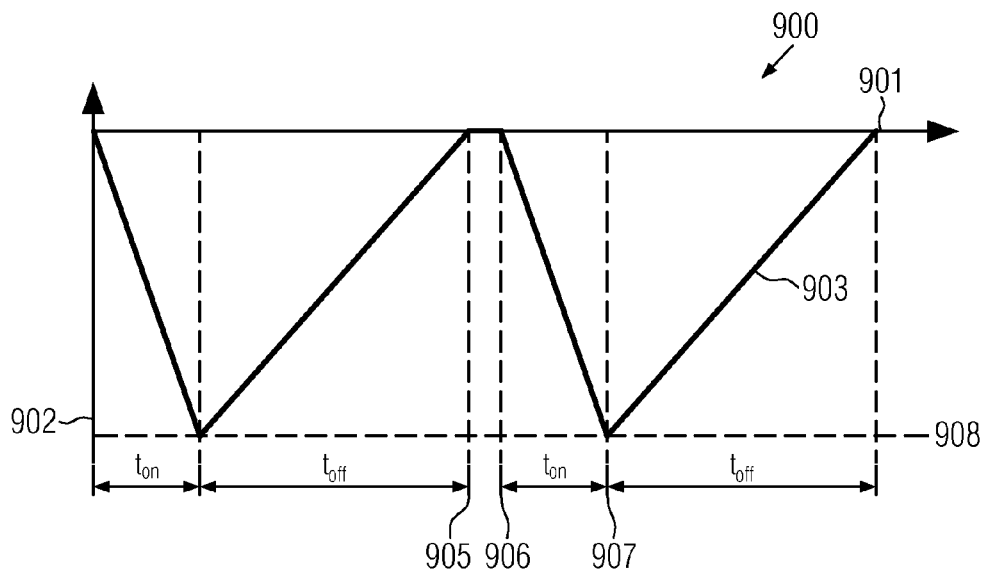

FIG. 9 shows a diagram 900 illustrating current flow through the inductance 501 of the active battery balancing circuit 600 in a method of battery balancing according to an embodiment of the present disclosure. A horizontal coordinate axis 901 denotes time, and a vertical coordinate axis 902 denotes the amperage of the current through the inductance 501. The amperage as a function of time is illustrated by curve 903.

First, the switching elements 621, 622 are switched into the electrically conductive state. Thus, a current from the battery 111 flows through the inductance 501 via the second circuit portion 516 and the second circuitry 519. Either upon the expiry of a predetermined time after the switching of the switching elements 621, 622 into the electrically conductive state, or upon the crossing of a threshold value 908 by the current through the inductance 501, the switches 621, 622 are switched into the electrically non-conductive state, and the switching elements of a selected one of the first circuit portions 511a, 511b, 511c are switched into the electrically conductive state. Thus, energy stored in the magnetic field that was created in the inductance 501 by the current from the battery 111 flowing through the switching elements 621, 622 flows into one or more of the cells of the battery 111 that are connected between the battery subunit connection terminals of the selected first circuit portion.

Since the first battery unit connection terminal 517 that is connected to the second inductance terminal 510 is electrically connected to the positive pole 112 of the battery 111, and the second battery unit connection terminal 518 that is connected to the first inductance terminal 509 is connected to the negative pole 113, the current that flows through the second circuitry 519 when the switching elements 621, 622 are closed is in the second direction (i.e., the technical current direction is from the second inductance terminal 510 to the first inductance terminal 509).

Accordingly, the current that flows through the selected one of the first circuit portions 511a, 511b, 511c when the switching elements 621, 622 are switched into the electrically non-conductive state and the switching elements of the selected first circuit portion are switched into the electrically conductive state is also in the second direction.

Hence, the entire battery 111 is discharged and the subset of the cells of the battery 111 that is connected to the selected one of the first circuit portions 511a, 511b, 511c is selectively charged. Since the voltage of the entire battery 111 is greater than the voltage of each of the subsets of the cells of the battery 111, the time $t_{on}$ during which current flows through the second circuit portion and during which the entire battery 111 is discharged, is longer than the time $t_{off}$ during which the current from the inductance 501 flows through the selected one of the first circuit portions 511a, 511b, 511c into the subset of the cells of the battery 111 connected to the selected first circuit portion.

In some embodiments, the selected first circuit portion can be the first circuit portion that is connected to the subset of the cells of the battery 111 having the lowest voltage. Thus, the subset of the cells of the battery 111 that has the lowest voltage and, accordingly, the lowest stage of charge, can be selectively charged and the other cells of the battery 111 can be discharged.

The control unit 620 can be configured to switch the switching elements of the selected one of the first circuit portions into the electrically non-conductive state as soon as or before the current through the inductance 501 measured by the current measuring means 521 becomes positive (at the point of time denoted by dashed line 905 in FIG. 9), such that a current flow from the cells of the battery connected to the selected first circuit portion into the inductance 501 that would discharge these cells again can be avoided.

At a point of time 906, the switching elements 621, 622 are switched into the electrically conductive state again and at a point of time 907, the switching elements 621, 622 are switched into the electrically non-conductive state, and the switching elements of one of the first circuit portions are switched into the electrically conductive state. Thus, the charge balancing process can be repeated.

In the embodiment described above with reference to FIG. 9, the charge balancing process is performed in a discontinuous manner, wherein the current through the inductance 501 becomes zero between the points of time 905, 906. In other embodiments, a discharging of the entire battery 111 and a selective charging of a subset of the cells of the battery can be performed in a continuous manner, as will be described in the following with reference to FIG. 10.

Figure 10:
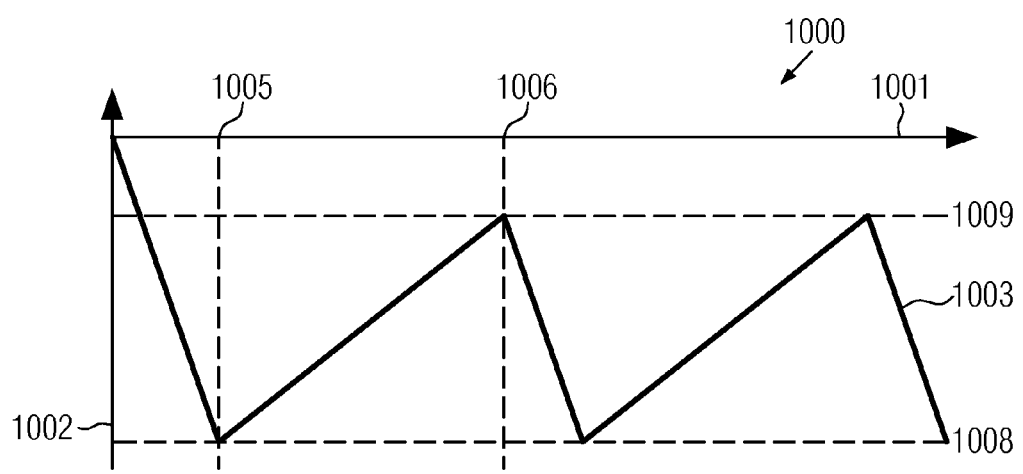

FIG. 10 shows a diagram 1000, wherein a horizontal coordinate axis 1001 denotes time, and a vertical coordinate axis 1002 denotes the amperage of the current through the inductance 501. The time-dependence of the amperage is illustrated by curve 1003.

Initially, the switching elements 621, 622 are switched into the electrically conductive state for allowing a current flow from the battery 111 through inductance 501. At a point of time 1005, which can be given by the expiry of a predetermined amount of time after the switching of the switching elements 621, 622 into the electrically conductive state, or by the crossing of a threshold value 1008 by the amperage of the current through the inductance 501, the switches 621, 622 are switched into the electrically non-conductive state and the switching elements of a selected one of the first circuit portions 511a, 511b, 511c can be switched into the electrically conductive state for selectively charging one or more cells electrically connected to the selected first circuit portion.

At a point of time 1006, which can be given by the expiry of a predetermined amount of time after the point of time 1005, or by the crossing of a second threshold value 1009 by the amperage of the current through the inductance 509, the switching elements of the selected one of the first circuit portions 511a, 511b, 511c are switched into the electrically non-conductive state. Simultaneously, the switching elements 621, 622 can be switched into the electrically conductive state again and the charge balancing process can be repeated. At the point of time 1006, there is still current flow through the inductance 501.

In still further embodiments, the switching elements of a first selected first circuit portion, for example, the switching elements 502a, 503a of the first circuit portion 511a can be switched into the electrically conductive state for creating a current flow through the inductance 501. Thereafter, the switching elements 502a, 503a can be switched into the electrically non-conductive state, and the current through the inductance 501 can be used for charging a subset of the cells of the battery 111 that is connected to a second selected first circuit portion, for example, the first circuit portion 511b. For this purpose, a switching element connected to the second battery subunit connection terminal of a first circuit portion adjacent the second selected first circuit portion 511b, for example the switching element 503a, and a switching element 502c connected to the first battery subunit connection terminal 511c of another first circuit portion adjacent the second selected circuit portion 502b, for example, the first circuit portion 511c, can be switched into the electrically conductive state. Thus, the current from the inductance 501 flows through the cell 102 connected to the second selected first circuit portion 511b in a direction from the positive pole to the negative pole thereof, such that the cell 102 is charged. Thus, a first subset of the cells of the battery 111 can be selectively discharged and a second subset of the cells of the battery 111 can be selectively charged, wherein each of the subsets comprises one or more, but not all, of the cells of the battery 111.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An active battery balancing circuit, comprising:
an inductance having a first inductance terminal and a second inductance terminal;
a first circuit portion that includes:
a first battery subunit connection terminal configured to be electrically coupled to a positive pole of a first subset of a plurality of cells of a battery unit;
a second battery subunit connection terminal configured to be electrically coupled to a negative pole of the first subset; and
first conductance circuitry configured to allow a current flow between the first battery subunit connection terminal and the first inductance terminal, through the inductance and between the second inductance terminal and the second battery subunit connection terminal, wherein the first conductance circuitry is configured to allow current flow through the first conductance circuitry in one of a first direction and a second direction, wherein the first direction is from the first inductance terminal to the second inductance terminal and the second direction is from the second inductance terminal to the first inductance terminal;

a second circuit portion that includes:
   a first battery unit connection terminal configured to be electrically coupled to a positive pole of the plurality of cells of the battery unit;
   a second battery unit connection terminal configured to be electrically coupled to a negative pole of the plurality of cells of the battery unit; and
   second conductance circuitry configured to allow a current flow between the second battery unit connection terminal and the first inductance terminal, through the inductance and between the second inductance terminal and the first battery unit connection terminal, wherein the second conductance circuitry is configured to allow current flow through the second conductance circuitry in the one of the first direction and the second direction, wherein at least one of the first conductance circuitry and the conductance second circuitry comprises one or more switching elements that are switchable between an electrically conductive state and an electrically non-conductive state to alternately allow current flow through the first conductance circuitry and the second conductance circuitry in the one of the first and second directions; and a control unit configured to switch the one or more switching elements to the electrically non-conductive state and enable the inductance to charge the plurality of cells in series.

2. The active battery balancing circuit according to claim 1, wherein:
   the first conductance circuitry comprises the one or more switching elements that include first and second switching elements and the control unit is configured to operate the first and second switching elements of the first conductance circuitry simultaneously;
   the first switching element is coupled between the first battery subunit connection terminal and the first inductance terminal; and
   the second switching element is coupled between the second battery subunit connection terminal and the second inductance terminal.

3. The active battery balancing circuit according to claim 2, wherein the control unit is configured to switch the first and second switching elements of the first conductance circuitry into the electrically non-conductive state in response to at least one of: a fixed time elapsing after a switching of the first and second switching elements into the electrically conductive state and a current flowing through the first conductance circuitry in the one of the first and second directions crosses a threshold value.

4. The active battery balancing circuit according to claim 2, wherein:
   the second conductance circuitry comprises first and second diodes;
   the first diode is electrically coupled between the second inductance terminal and the first battery unit connection terminal, and has a forward direction from the second inductance terminal to the first battery unit connection terminal; and
   the second diode is electrically coupled between the second battery unit connection terminal and the first inductance terminal, and has a forward direction from the second battery unit connection terminal to the first inductance terminal.

5. The active battery balancing circuit according to claim 2, wherein the second conductance circuitry comprises third and fourth switching elements and the control unit is configured to operate the third and fourth switching elements simultaneously;
   the third switching element being electrically coupled between the second inductance terminal and the first battery unit connection terminal;
   the fourth switching element being electrically coupled between the second battery unit connection terminal and the first inductance terminal.

6. The active battery balancing circuit according to claim 5, wherein the control unit is configured to switch the third and fourth switching elements such that the third and fourth switching elements of the second circuitry are in the electrically conductive state when the first and second switching elements of the first circuitry are in the electrically non-conductive state, and to switch the third and fourth switching elements of the second circuitry into the electrically non-conductive state in response to at least one of: a fixed time elapsing after switching the third and fourth switching elements of the second circuitry into the electrically conductive state and the current flowing through the second circuitry in the one of the first and second directions crosses a threshold value.

7. The active battery balancing circuit according to claim 1, comprising:
   a third circuit portion that includes:
      a third battery subunit connection terminal configured to be electrically coupled to a positive pole of a second subset of the plurality of series-connected cells of the battery unit;
      a fourth battery subunit connection terminal configured to be electrically coupled to a negative pole of the second subset; and
      third conductance circuitry configured to allow a current flow between the third battery subunit connection terminal and the first inductance terminal, through the inductance and between the second inductance terminal and the fourth battery subunit connection terminal, wherein the third conductance circuitry is configured to allow current flow through the third conductance circuitry in one of the first and second directions and the first and third conductance circuits include first and second switching elements, respectively, wherein the control unit is configured to measure a first voltage between the first and the second battery subunit connection terminals of the first circuitry, measure a second voltage between the third and fourth battery subunit connection terminals, and selectively operate one of the first and second switching element based on a value of the first voltage with respect to the second voltage.

8. The active battery balancing circuit according to claim 1, comprising:
   a third circuit portion that includes:
      a third battery subunit connection terminal configured to be electrically coupled to a positive pole of a second subset of the plurality of series-connected cells of the battery unit;

a fourth battery subunit connection terminal configured to be electrically coupled to a negative pole of the second subset; and third conductance circuitry configured to allow a current flow between the third battery subunit connection terminal and the first inductance terminal, through the inductance and between the second inductance terminal and the fourth battery subunit connection terminal, wherein the third conductance circuitry is configured to allow current flow through the third conductance circuitry in one of the first and second directions and the first and third conductance circuits include first and second switching elements, respectively, wherein the control unit is configured to sequentially operate the first and second switching elements.

9. The active battery balancing circuit according to claim 8, wherein the control unit is configured to switch at least one of the first and second switching elements into the electrically conductive state in response to at least one of: the current flowing through the second circuitry crossing a threshold value and a fixed time elapsing after switching the first and second switching elements into the electrically non-conductive state.

10. A power source, comprising:
a battery comprising a plurality of cells;
an active battery balancing circuit that includes:
   an inductance having a first inductance terminal and a second inductance terminal;
   a first circuit portion that includes:
      a first battery subunit connection terminal configured to be electrically coupled to a positive pole of a first subset of a plurality of cells of a battery unit;
      a second battery subunit connection terminal configured to be electrically coupled to a negative pole of the first subset; and
      first conductance circuitry configured to allow a current flow between the first battery subunit connection terminal and the first inductance terminal, through the inductance and between the second inductance terminal and the second battery subunit connection terminal, wherein the first conductance circuitry is configured to allow current flow through the first conductance circuitry in one of a first direction and a second direction, wherein the first direction is from the first inductance terminal to the second inductance terminal and the second direction is from the second inductance terminal to the first inductance terminal;
   a second circuit portion that includes:
      a first battery unit connection terminal configured to be electrically coupled to a positive pole of the plurality of cells of the battery unit;
      a second battery unit connection terminal configured to be electrically coupled to a negative pole of the plurality of cells of the battery unit; and
      second conductance circuitry configured to allow a current flow between the second battery unit connection terminal and the first inductance terminal, through the inductance and between the second inductance terminal and the first battery unit connection terminal, wherein the second conductance circuitry is configured to allow current flow through the second conductance circuitry in the one of the first direction and the second direction, wherein at least one of the first conductance circuitry and the second conductance circuitry comprises one or more switching elements that are switchable between an electrically conductive state and an electrically non-conductive state to alternately allow current flow through the first conductance circuitry and the second conductance circuitry in the one of the first and second directions; and
   a control unit configured to switch the one or more switching elements to the electrically non-conductive state and enable the inductance to charge the plurality of cells in series.

11. The power source according to claim 10, wherein the first circuit portion is one of a plurality of first circuit portions equal in number to the cells of the battery.

12. The power source according to claim 11, wherein the first circuit portions include respective first and second battery subunit connection terminals electrically connected to a positive and a negative pole, respectively, of a respective one of the cells of the battery.

13. The power source according to claim 12, wherein the first and the second battery unit connection terminals of the second circuit portion are connected to a positive and a negative pole, respectively, of the battery.

14. A method, comprising:
allowing, by a first conductance circuitry, a current flow between a first battery subunit connection terminal of a first circuit portion and a first inductance terminal of an inductance, through the inductance and between a second inductance terminal of the inductance and a second battery subunit connection terminal of the first circuit portion, the first battery subunit connection terminal being electrically coupled to a positive pole of a first subset of a plurality of cells of a battery unit and the a second battery subunit connection terminal being electrically coupled to a negative pole of the first subset, wherein the first conductance circuitry allows the current flow through the first conductance circuitry in one of a first direction and a second direction, wherein the first direction is from the first inductance terminal to the second inductance terminal and the second direction is from the second inductance terminal to the first inductance terminal;
allowing, by a second conductance circuitry, a current flow between a second battery unit connection terminal of a second circuit portion and the first inductance terminal, through the inductance and between the second inductance terminal and a first battery unit connection terminal of the second circuit portion, the first battery unit connection terminal being electrically coupled to a positive pole of the plurality of cells of the battery unit and the second battery unit connection terminal being electrically coupled to a negative pole of the plurality of cells of the battery unit, wherein the second conductance circuitry allows current flow through the second conductance circuitry in the one of the first direction and the second direction, wherein at least one of the first conductance circuitry and the conductance second circuitry comprises one or more switching elements that are switchable between an electrically conductive state and an electrically non-conductive state to alternately allow current flow through the first conductance circuitry and the second conductance circuitry in the one of the first and second directions; and
switching, by a control unit, the one or more switching elements to the electrically non-conductive state and enabling the inductance to charge the plurality of cells in series.

15. The method as in claim 14, further comprising selecting one of the plurality of cells of the battery unit having at least one of a greatest voltage and a highest state of charge, wherein the selected cell forms the first subset of the plurality of cells of the battery unit.

16. The method as in claim 14, further comprising repeating at least once providing the current flow from the first subset through the inductance, disconnecting the first subset of the plurality of cells of the battery unit, and switching the one or more switching elements to the electrically non-conductive state and enabling the inductance to charge the plurality of cells of the battery unit.

17. The method as in claim 16, wherein the repeating is started in response to at least one of a current flow into the plurality of cells falling below a threshold value and a fixed time elapsing after the start of the current flow into the plurality of cells of the battery unit.

18. The method as in claim 14, wherein the first subset of the plurality of cells of the battery unit comprises two or more cells of the battery unit or a single cell having at least one of a lowest voltage and a lowest state of charge of the plurality of cells of the battery unit.

19. The method as in claim 14, wherein the first subset of the plurality cells of the battery unit comprises the plurality of cells of the battery unit.

* * * * *